Oct. 24, 1933.  J. HROMADKA  1,931,988
STRAINER FOR COOLING SYSTEMS OF INTERNAL COMBUSTION ENGINES
Filed Oct. 22, 1931

Inventor
Joseph Hromadka
By Rockwell & Bartholow

Patented Oct. 24, 1933

1,931,988

UNITED STATES PATENT OFFICE 1,931,988

STRAINER FOR COOLING SYSTEMS OF INTERNAL-COMBUSTION ENGINES

Joseph Hromadka, Hamden, Conn.

Application October 22, 1931. Serial No. 570,307

3 Claims. (Cl. 210—165)

This invention relates to a strainer or trap for a cooling system of an internal combustion engine and more especially to a strainer adapted to remove rust, sand or other sediment from the cooling water of the engine.

The principal object of the invention is to bring about a form of strainer in which a chamber is provided into which sediment may freely pass but in which there is relatively no tendency for the sediment to be stirred up and again circulated.

Another object of the invention is to bring about a form of strainer which will operate efficiently in either horizontal or vertical positions or at any angle between the horizontal and vertical.

A feature of the invention resides in a simple form of strainer which may be cheaply manufactured, and in which sheet metal parts may be largely used if desired.

To these and other ends, the invention consists in the novel features and combinations of parts to be hereinafter described and claimed.

Figure 1:
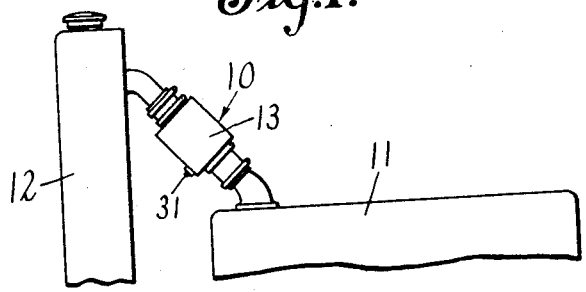
Fig. 1 is a view of a part of an internal combustion engine and radiator therefor having a strainer according to my invention connected in the cooling system thereof.

Referring then to the drawing in which I have illustrated my invention by showing a preferred embodiment of the same, the reference numeral 10 indicates, in general, the improved strainer which, as shown in Fig. 1 of the drawing, may be connected between an internal combustion engine 11 and a radiator 12.

Figure 2:
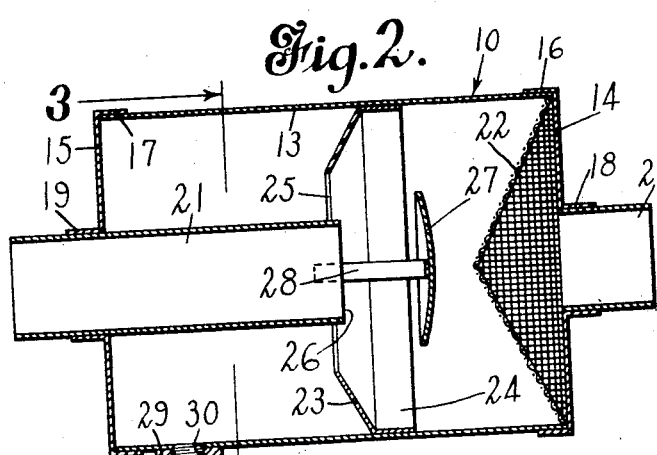
Fig. 2 is a cross-sectional view of the strainer shown in Fig. 1 but on an enlarged scale.
Figure 3:
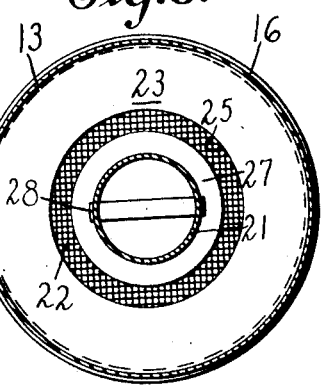
Fig. 3 is a cross-sectional view along line 3—3 of Fig. 2.

The strainer shown in Figs. 2 and 3 of the drawing, comprises a cylindrical shell 13 having at the ends thereof caps or covers 14 and 15, the latter being provided on their peripheries with flanges 16 and 17, embracing the shell 13, and centrally located annular flanges 18 and 19 in which outlet and inlet pipes 20 and 21 are fixedly mounted. In the end of shell 13 adjacent the outlet pipe 20 is a screen 22, the screen 22, in this instance, being of conical shape and having its base resting on cover 14, screen 22 being spaced somewhat from a baffle 23 in the form of a truncated cone and having a peripheral flange 24 fitting within and secured to the inner walls of shell 13, and an aperture 25 aligned with the end of inlet pipe 21. Inlet pipe 21 extends into shell 13 a considerable distance, in this instance, substantially half-way between covers 14 and 15, terminating at a spaced interval from the aperture 25 of baffle 23. Supported from the end 26 of pipe 21 is a second baffle 27 somewhat saucer-shaped and having its concave side facing pipe 21, baffle 27 being supported from pipe 21 by one or more strips 28. A boss 29 is welded or otherwise secured on shell 13 adjacent cover 15, boss 29 and shell 13 being provided with a threaded opening 30 for a plug 31.

In operation, water passing through the cooling system of the internal combustion engine or other device, enters the shell 13 through pipe 21 and impinges on baffle 27, any rust or other sediment in the water rebounding from the baffle 27 and passing into shell 13 between baffle 23 and cover 15, the water free from the sediment passing outwardly around baffle 27 and baffle 23 and through screen 22 and thence through outlet pipe 20. It will be readily understood that since the inlet pipe extends into shell 13 a considerable distance, there will be relatively little, if any, turbulency in the water in shell 13 between the end 26 of pipe 21 and cover 15, so that the sediment may settle therein without danger of again being brought into circulation. When a sufficient amount of sediment has been collected in shell 13 to warrant the flushing of the same, the plug 31 may be removed, whereupon the water in the shell may be drained, the water flushing out the sediment as it passes through opening 30.

Figure 4:
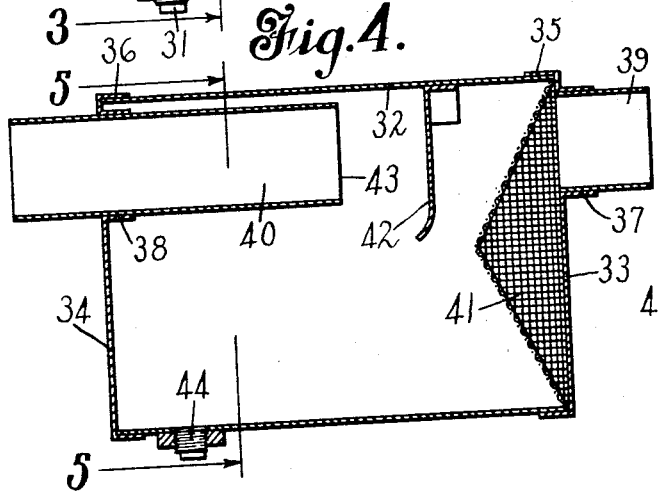
Fig. 4 is a view similar to Fig. 2 but showing a modified form.
Figure 5:
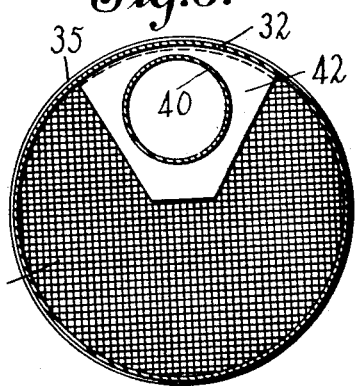
Fig. 5 is a cross-sectional view along line 5—5 of Fig. 4.

In Figs. 4 and 5 of the drawing, the shell 32 is provided at its ends with covers 33 and 34, having peripheral flanges 35 and 36 embracing shell 32, and flanges 37 and 38 in which outlet pipes 39 and 40 are mounted, outlet pipes 39 and 40 being eccentric with respect to shell 32. In the end of shell 32 adjacent cover 33 is a conical screen or strainer 41, while suspended from the upper end of shell 32 is a baffle 42, baffle 42 being spaced somewhat from screen 41 and from the end 43 of pipe 40, the latter extending, in this instance, substantially half-way through shell 32 and being in alignment with baffle 42 and pipe 39.

The operation of the strainer shown in Figs. 4 and 5 is quite similar to that shown in Figs. 2 and 3, the baffle 42 causing sediment to rebound into the end of shell 32 adjacent cover 34, the clean water passing around the lower end and side edges of baffle 42, through screen 41 and through outlet pipe 39. It will be readily understood that the strainer is normally filled with water and that the movement of the water occurs between the end 43 of pipe 40 around the baffle 42 and thence outwardly through screen 41 and pipe 39, there being relatively little, if any, movement of the water contained in the end of shell 32 adjacent cover 34, so that sediment settling in this end of shell 32 does not tend to be taken up by the water and circulated in the cooling system. A plug 44 is provided in the lower end of shell 32, near cover 34, by means of which the sediment may be flushed from the strainer.

While the strainers are shown in horizontal position in Figs. 2 and 4 of the drawing, it will be readily understood that the above described operation of the strainers applies equally well when the strainers are mounted in vertical positions or at various angles between the horizontal and vertical. The structure is such that substantially all of the parts may be made out of sheet metal punchings or stampings and assembled into a complete strainer at relatively low cost.

While I have shown and described a preferred embodiment of my invention, it will be understood that it is not to be limited to all of the details shown, but is capable of modification and variation within the spirit of the invention and within the scope of the appended claims.

What I claim is:

1. In a strainer, a hollow body forming a chamber, an outlet pipe at one end of the chamber, an inlet pipe at the other end of the chamber, said inlet pipe extending a substantial distance into the chamber, a baffle in the chamber opposite the discharge end of the inlet pipe whereby the entering liquid impinges upon the baffle, a second baffle of frusto-conical shape in the chamber and having an opening in its smaller end aligned with the discharge opening in the inlet pipe whereby the water from the inlet pipe is discharged through said opening against the first baffle, said frusto-conical baffle being secured to the body at the peripheral portion of its larger end and being inclined toward the base of the inlet pipe.

2. In a strainer, a hollow body forming a chamber, an inlet pipe extending a substantial distance within the chamber through one end of the body, a baffle of frusto-conical shape having an opening in its smaller end in alignment with and forwardly of the discharge end of the inlet pipe, said baffle flaring away from the inlet pipe and being secured to the wall of the chamber at its larger end, a second baffle located forwardly of the first, and in alignment with the discharge opening of the inlet pipe, an outlet pipe in the other end of the body, and a screen covering said outlet pipe.

3. In a strainer, a hollow body providing a chamber, an inlet pipe extending a substantial distance into the chamber at one end thereof to provide a sediment collecting space about the base of the pipe, a baffle opposite and spaced from the discharge end of the pipe, against which the entering liquid impinges, a second baffle extending from the wall of the body to a point closely adjacent the end of the inlet pipe to deter the liquid impinging on the first baffle from passing directly into the sediment collecting space, said second baffle having an opening opposite the discharge end of the inlet pipe through which the liquid is discharged against the first baffle, an outlet pipe in the end of the body opposite the inlet pipe, and a screen covering the outlet pipe.

JOSEPH HROMADKA.